(12) United States Patent
Kerns et al.

(10) Patent No.: US 10,394,409 B2
(45) Date of Patent: Aug. 27, 2019

(54) SECURE DISPENSING AND PLAY OF INSTANT PROBABILITY GAMES

(71) Applicant: Diamond Game Enterprises, Chatsworth, CA (US)

(72) Inventors: Randee R. Kerns, South Richmond Hill, NY (US); James A. Breslo, Pacific Palisades, CA (US); William F. Breslo, Topanga, CA (US); Robert J. Siemasko, Las Vegas, NV (US); Kenneth E. Irwin, Jr., Dawsonville, GA (US)

(73) Assignee: Diamond Game Enterprises, Chatsworth, CA (US)

( * ) Notice: Subject to any disclaimer, the term of this patent is extended or adjusted under 35 U.S.C. 154(b) by 0 days.

(21) Appl. No.: 15/596,732

(22) Filed: May 16, 2017

(65) Prior Publication Data
US 2018/0335875 A1    Nov. 22, 2018

(51) Int. Cl.
*G07F 17/32*    (2006.01)
*A63F 3/06*    (2006.01)
*G06F 3/048*    (2013.01)
*H04W 12/12*    (2009.01)

(52) U.S. Cl.
CPC ............ *G06F 3/048* (2013.01); *G07F 17/329* (2013.01); *H04W 12/12* (2013.01); *A63F 3/0665* (2013.01)

(58) Field of Classification Search
None
See application file for complete search history.

(56) References Cited

U.S. PATENT DOCUMENTS

| | | | |
|---|---|---|---|
| 1,157,898 A | 10/1915 | Perret | |
| 2,692,777 A | 10/1954 | Miller | |
| 4,807,884 A | 2/1989 | Breeding | |
| 4,832,342 A | 5/1989 | Plevyak et al. | |
| 5,471,039 A | 11/1995 | Irwin, Jr. et al. | |
| 5,475,205 A | 12/1995 | Behm et al. | |
| 5,941,771 A * | 8/1999 | Haste, III | A63F 3/0645 273/139 |
| 6,053,405 A | 4/2000 | Irwin, Jr. et al. | |
| 6,149,154 A | 11/2000 | Grauzer et al. | |
| 6,155,491 A | 12/2000 | Dueker et al. | |
| 6,186,494 B1 | 2/2001 | Merkli | |

(Continued)

OTHER PUBLICATIONS

Probaility Scratch Offs. Winning Promotions, LLC, web page downloaded from: http://www.winpromos.com/products/scratchoffs_probability, download date: Oct. 27, 2015, 2 pages.

(Continued)

*Primary Examiner* — Damon J Pierce
(74) *Attorney, Agent, or Firm* — Panitch Schwarze Belisario & Nadel LLP

(57) ABSTRACT

A method and system are provided with instant probability tickets combined with gaming machines wherein the win/lose outcome of the probability game is determined by the subset selections the player makes from a superset comprising a multiplicity of possible game element spots. The gaming machines hold the purchased probability ticket in escrow in an internal region of the gaming machine such that the player cannot gain physical access to the probability ticket until he or she commits to a selection of subset game elements.

11 Claims, 12 Drawing Sheets

(56) References Cited

U.S. PATENT DOCUMENTS

| | | |
|---|---|---|
| 6,299,167 B1 | 10/2001 | Sines et al. |
| 6,379,742 B1 | 4/2002 | Behm et al. |
| 6,435,408 B1 | 8/2002 | Irwin, Jr. et al. |
| 6,491,215 B1 | 12/2002 | Irwin, Jr. et al. |
| 6,533,274 B1 | 3/2003 | Heggerty |
| 6,776,337 B2 | 8/2004 | Irwin, Jr. et al. |
| 7,677,566 B2 | 3/2010 | Krenn et al. |
| 7,695,360 B2 | 4/2010 | Breslo |
| 8,002,622 B2 | 8/2011 | Breslo |
| 8,206,207 B2 | 6/2012 | Breslo |
| 8,292,732 B2 | 10/2012 | Breslo |
| 2004/0034775 A1 | 2/2004 | Desjardins et al. |
| 2006/0094491 A1* | 5/2006 | Breslo ................ A63F 3/06 463/17 |
| 2007/0259719 A1* | 11/2007 | Kane ................ G07F 17/32 463/43 |
| 2009/0121425 A1* | 5/2009 | Berkowitz .......... A63F 3/0665 273/139 |
| 2012/0122537 A1 | 5/2012 | Bettcher et al. |

OTHER PUBLICATIONS

Promotional Game Cards & Scratch Card Printing. Game Set & Match (UK) Ltd, web page downloaded from: http://www.gamesetandmatch.com/promotional-game-cards/probability, download date: Oct. 27, 2015, 2 pages.

\* cited by examiner

SECURE DISPENSING AND PLAY OF INSTANT PROBABILITY GAMES

BACKGROUND OF THE INVENTION

1. Field of the Invention

The present invention is the innovation of control mechanisms for enabling Instant Ticket Vending Machines (ITVMs) to offer instant probability games where any probability ticket has the potential to win at least one prize assuming the player (consumer) makes the correct selection. Specifically, this innovation resolves the security related problems of offering instant probability games to the public by effectively holding an instant probability game ticket in escrow until the player commits to a selection. Optionally, an electronic record of players' probability game choices is maintained, thereby providing an auditable electronic means to ensure that actual play and payouts are within acceptable mathematical theoretical parameters, such as "3σ" or three standard deviations.

2. Background

Lottery games have become a time honored method of raising revenue for state and federal governments the world over. Traditional scratch-off and draw games have evolved over decades, supplying increasing revenue year after year. However, after decades of growth, the sales curves associated with traditional games seem to be flattening out. This flattening of lottery sales curves is typically attributed to a fixed base of players that routinely purchase lottery products with very few new players choosing to participate in the lottery marketplace. Various analyses of state lottery sales data tend to support the hypothesis that lotteries rely heavily on an existing player base and more specifically on lottery "super users." Three states (Rhode Island, South Dakota and Massachusetts) had 2014 lottery sales that topped $700 per capita. While ten states had per capita sales below $100, per capita sales for all state lotteries averaged almost $250. Demographically speaking, this existing base of lottery players is aging with younger players showing very little interest in participating in existing lottery offerings. Thus, the potential for ever-increasing lottery sales is increasingly problematic with the existing fixed base of players saturated. Consequently, both lotteries and their service providers are presently searching for new forms of gaming.

In addition to flattening sales, a static lottery player base is often sited as exploiting problem gamblers with various legislatures debating restrictions or probations being placed on lotteries. For example, "Stop Predatory Gambling", which advocates an end to state-sponsored gambling recently stated: "State lotteries have a business model that's based on getting up to 70 to 80 percent of their revenue from 10 percent of the people that use the lottery . . . ." In Minnesota, a pending bipartisan bill would require 25% of lottery billboards to be dedicated to a warning about the odds of winning, cautions about addiction, and information on where problem gamblers can seek help.

In an attempt to diversify their base and increase sales, United States Lotteries have come to appreciate the virtues of producing games with more entertainment value that can be sold at a premium price. For instance, ten-dollar instant ticket (i.e., scratch-off) games with higher paybacks and more ways to win now account for over $5 billion a year in United States lottery sales. But by their nature, high-volume, generic, higher priced instant games are a minor part of overall game offerings and although they have their place, they have limited potential for assisting in player base diversification. Additionally, these higher priced and high-volume games also typically add little unique entertainment value relative to lower priced instant tickets and consequently do not to attract many new players.

Additionally, Instant Ticket Vending Machines (ITVMs) were created to enable instant ticket games to be played with enhanced entertainment and appeal resulting in increased revenue. As their name implies, ITVMs rely on prize awards of instant tickets or pull-tabs dispensed at the time of play to determine the outcome of an entertaining (i.e., video display) game. See, for example, U.S. Pat. No. 7,695,360 (Breslo); U.S. Pat. No. 8,002,622 (Breslo); U.S. Pat. No. 8,206,207 (Breslo); and U.S. Pat. No. 8,292,732 (Breslo). While ITVMs have enjoyed some distribution with some state lotteries with enhanced sales, their usage is not as widespread as other lottery products (e.g., draw games, instant tickets) and consequently have only marginally contributed to diversifying the player base.

In another attempt to resolve these difficulties, lotteries and commercial contest providers have multiple times attempted to introduce instant probability games in which every instant ticket has the potential to win at least one prize assuming the player makes a correct selection i.e., a scratch-off ticket in which the player only scratches a subset of the total number of scratch-off spots available, thus assuming the player selects a winning combination of scratch-off spots he or she wins; conversely, if non-winning spots were selected by the player he or she is free to scratch-off the remaining spots to prove that the game was legitimate and that they could have won if only they had selected the correct spots. However, to date, instant ticket (i.e., scratch-off) probability games have been fraught with security problems. There have been numerous attempts at fraud with these types of tickets, typically with the nefarious members of the public attempting to defraud the system with various "pin prick", "over scratch", and "mechanical lift" attacks.

With "pin-prick" attacks on instant tickets a nefarious person attempts to identify winning indicia via a series of small holes in the Scratch-Off Coating (SOC) such that the attacked ticket still appears to be intact and unplayed to the untrained or unassisted eye yet conveys enough information under magnification to identify winning indicia. "Over scratch" attacks refer to a technique where a nefarious player intentionally partially removes the SOC of adjacent spots in an attempt to identify the concealed indicia. "Mechanical lift" attacks refer to a process that uses a flat blade (e.g., X-Acto® chisel blade #17) or other device to peel back a portion of the SOC to reveal previously hidden variable indicia. The lifted SOC is then rolled back into place and glued such that it is not obvious that the integrity of the SOC has been breached.

The industry has developed countermeasures to the previously described pin prick, over scratch, and mechanical lift techniques. See, for example, U.S. Pat. No. 5,471,039 (Irwin et al.); U.S. Pat. No. 5,475,205 (Behm et al.); U.S. Pat. No. 6,053,405 (Irwin et al.); U.S. Pat. No. 6,379,742 (Behm et al.); U.S. Pat. No. 6,435,408 (Irwin et al.); U.S. Pat. No. 6,491,215 (Irwin et al.); and U.S. Pat. No. 6,776,337 (Irwin et. al.), all of which are concerned with embedding electronic circuitry into the SOC such that an External Verification Machine (EVM) could test the integrity of the unscratched spots to determine if a ticket was a legitimate winner or a nefarious fraud attempt. Additionally, U.S. Pat. No. 6,155,491 (Dueker et al.) and U.S. Pat. No. 6,186,494 (Ehrhart et al.) involve adding optical taggants to one or more layers of the SOC or one or more layers underneath the SOC such that an EVM can optically detect tampering in unscratched spots of an instant probability ticket.

However, both series of instant probability game countermeasure patents and their associated technology failed to be a commercial success primarily because an optimal balance was never obtained between "false rejects" and "false accepts" when processing instant lottery probability tickets with an EVM. The terms "false rejects" and "false accepts" are commonly used in security systems to describe the inherent diametrically opposed relationship with any security system inadvertently accepting a document or person that is fraudulent (i.e., "false accepts") as opposed to inadvertently rejecting a document or person that should rightfully gain access or winning status (i.e., "false rejects")—see FIG. 1A.

As illustrated in FIG. 1A, with any machine detectable security system 100 there are tradeoffs associated with "false accepts" 103 verses "false rejects" 104. If you have too many "false accepts" 103, (economically feasible for someone to make a profit defrauding the system) your system is not secure. However, if you have too many "false rejects" 104 no one will want to use your security system. In general, the higher the security (sensitivity) 102 the higher the cost and the greater negative impact on operational efficiency— i.e., the higher the occurrences 101 of "false rejects" 104. In other words, if an access control or validation security system is cumbersome and slow, the "cost" of implementing the system must take into account the decrease in efficiency of users and their reluctance to utilize the system.

Consider the example of being tasked with designing the security system for an Automatic Teller Machine (ATM). If the top priority is being "user friendly" one might design it with a 1-digit Personnel Identification Number (PIN)—i.e., very low "false rejects" 104 because almost anybody can remember a 1-digit PIN. However, if one is paranoid, the system might be designed to require a 15-digit PIN—i.e., very low "false accepts" 103 because the odds of an impostor guessing the PIN are 1-out-of $1\times10^{15}$. However, in the real world neither system is practical—the number of "false accepts" 103 is too high for the "user friendly" system and the number of "false rejects" 104 is too high for the paranoid system.

This same tradeoff between "false accepts" 103 verses "false rejects" 104 was the basic drawback with both the Irwin/Behm and Dueker/Ehrhart patents and associated technology described above. The fundamental problem being when an instant (i.e., scratch-off) probability ticket is given to a player to select a series of scratch-off spots with the ticket later returned for validation, there is a significant time period available for a nefarious person to perform sophisticated fraudulent pin-prick and lifting attacks in complete privacy. Thus, the sophistication of the pin-prick and lifting attacks mandates that the sensitivity 102 of the EVM be increased to reduce the number of "false accepts" 103 to the point that the fraudulent attempts are not economically feasible. However, as shown in graph 100, typically at the point where the EVM sensitivity 102 is increased such that the number of "false accepts" 103 starts to asymptotically approach zero or at least a tolerable level, the number of "false rejects" 104 increases typically exponentially such that no legitimate player wishes to use the product. Regrettably, attempting to balance the "false accepts" 103 and "false rejects" 104 rates to approximately the same number of occurrences 105 typically results in an unacceptable number of both "false accepts" 103 and "false rejects" 104.

Numerous attempts were made to fine-tune both the Irwin/Behm and Dueker/Ehrhart patents and associated technology to commercially acceptable parameters; however, neither technology ever achieved an acceptable balance of both "false accepts" 103 and "false rejects" 104. In fact, it was generally observed that the fraudulent attempts became more sophisticated as the technology evolved. For example, pin-prick attacks with hole sizes around 0.005 inch (0.13 mm) were successfully detected with "Irwin/Behm technology (i.e., no "false accepts" 103); however, with the sensitivity 102 threshold capable of detecting this level of sophisticated pin-prick attack, the number of occurrences 101 of "false rejects" 104 rose to an unacceptable level e.g., a legitimately played ticket in which a women scratched off the spots by using her car key as a scratcher was "false rejected" because the other keys on her ring dragged across the unscratched spots. Consequently, various lotteries stopped the sales of instant probability ticket and the product was ultimately withdrawn from the marketplace.

Thus, the fundamental problem of United States lotteries diversifying their base and increasing their sales remains with no new significant forms of gaming introduced in recent memory. While instant probability games offer the potential for attracting a new player base, security concerns and tradeoffs between "false accepts" and "false rejects" have to date made such types of games not commercially viable. Consequently, the lottery and gaming industry is in need of new types of games to potentially enable the sale and redemption of instant probability tickets.

SUMMARY OF THE INVENTION

Objects and advantages of the invention will be set forth in part in the following description, or may be obvious from the description, or may be learned through practice of the invention.

Described are mechanisms, systems, and methodologies related to conducting an instant probability game using a gaming machine to dispense the probability game tickets thereby enabling hitherto unknown methods of secure and ergonomic probability game play. The security of the invention is principally derived from holding a purchased probability ticket in escrow in an internal region of the gaming machine until the player (consumer) first commits to a selection of a probability game elements subset from a larger set of offered gaming elements. The committing process effectively locks in the player's choices prior to the probability ticket being dispensed, thereby allowing him or her to gain the physical access of the played probability ticket.

In a general embodiment, the indicia on the next probability ticket to be dispensed are scanned within the gaming machine to identify the game elements of the probability ticket and the associated winning pattern(s). These identified game elements are then displayed electronically to the player such that the identities of the winning indicia pattern(s) remain unknown until the player electronically commits his or her selections associated with the game elements of the probability ticket, thereby completing game play. Depending on the player's selections, the player is electronically (e.g., video, audio) informed if he or she won or lost the game and the played probability ticket is dispensed to the player. This general embodiment has the advantages of backward compatibility with existing ITVMs (Instant Ticket Vending Machines) as well as providing potentially more marketable probability tickets to players.

In another embodiment, the preprinted probability tickets are rearranged or shuffled after being installed in the gaming machine on a pseudorandom or random basis thereby ensuring that the human installer will have no a priori knowledge of the order that the preprinted probability tickets will be dispensed. This embodiment has the advantage of potentially increased security against insider fraud.

In still another embodiment, at least a portion of the preprinted probability tickets indicia are at least partially covered with a Scratch-Off Coating (SOC). The ticket is dispensed with the SOC intact and later removed by the player. This embodiment has the advantages of potentially higher security as well potentially increasing the perception of legitimacy and game play of the probability game from the player's perspective.

In yet another specific embodiment, the probability ticket to be dispensed is printed within the gaming machine after the purchase has been made with the recently printed ticket held in escrow in an internal region of the gaming machine until the player first commits to a selection of the printed probability ticket game elements subset from a larger set of offered gaming elements.

In a preferred specific embodiment, the internal region of the gaming machine that effectively holds the purchased probability ticket in escrow prior to player game element selection, commitment, and dispensing allows at least a portion of the escrowed probability ticket to be viewed by the player prior to the selection process. This embodiment has the advantage of potentially increasing the perception of legitimacy of the probability game from the player's perspective.

Described are a number of mechanisms and methodologies that provide practical details for reliably producing instant probability games using a gaming machine to dispense probability game tickets. Although the examples provided herein are primarily related to ITVMs, it is clear that the same methods are applicable to any type gaming machine dispensing instant probability tickets.

DETAILED DESCRIPTION OF THE INVENTION

Figure 1A:
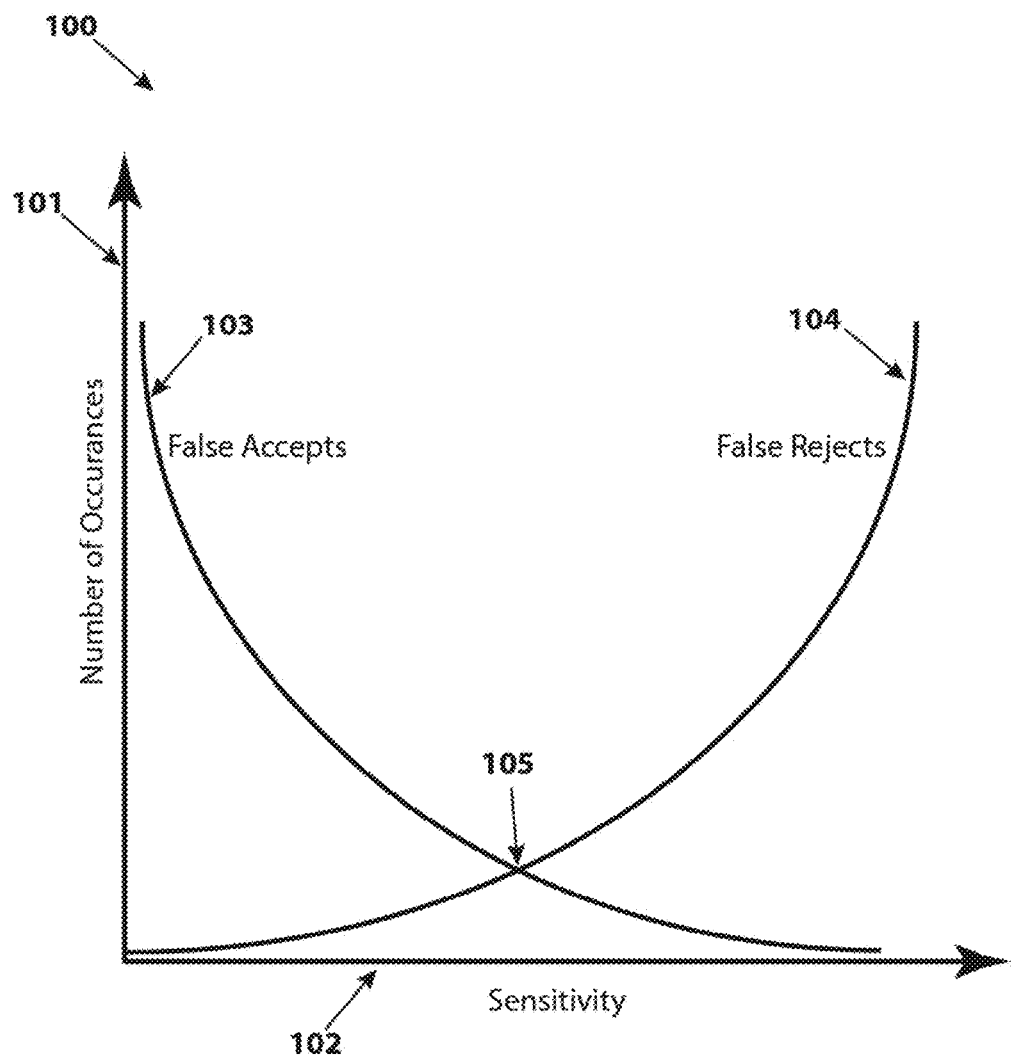
FIG. 1A is a, prior art, graph of a representative example of the traditional tradeoffs associated with balancing a security system with acceptable levels of "false accepts" and "false rejects,"

Before describing the present invention, it is useful to first provide a brief description of the current state of the art of instant probability tickets and Instant Ticket Vending Machines (ITVMs) so as to ensure that a common lexicon is established of existing technology prior to describing the present invention. This description of the current state of the art of instant probability tickets and ITVMs is provided in the discussions of FIG. 1B and FIG. 1C with FIG. 1A illustrating the traditional tradeoffs associated between "false accepts" and "false rejects" in any security system as discussed in the background section of this document.

Figure 1B:
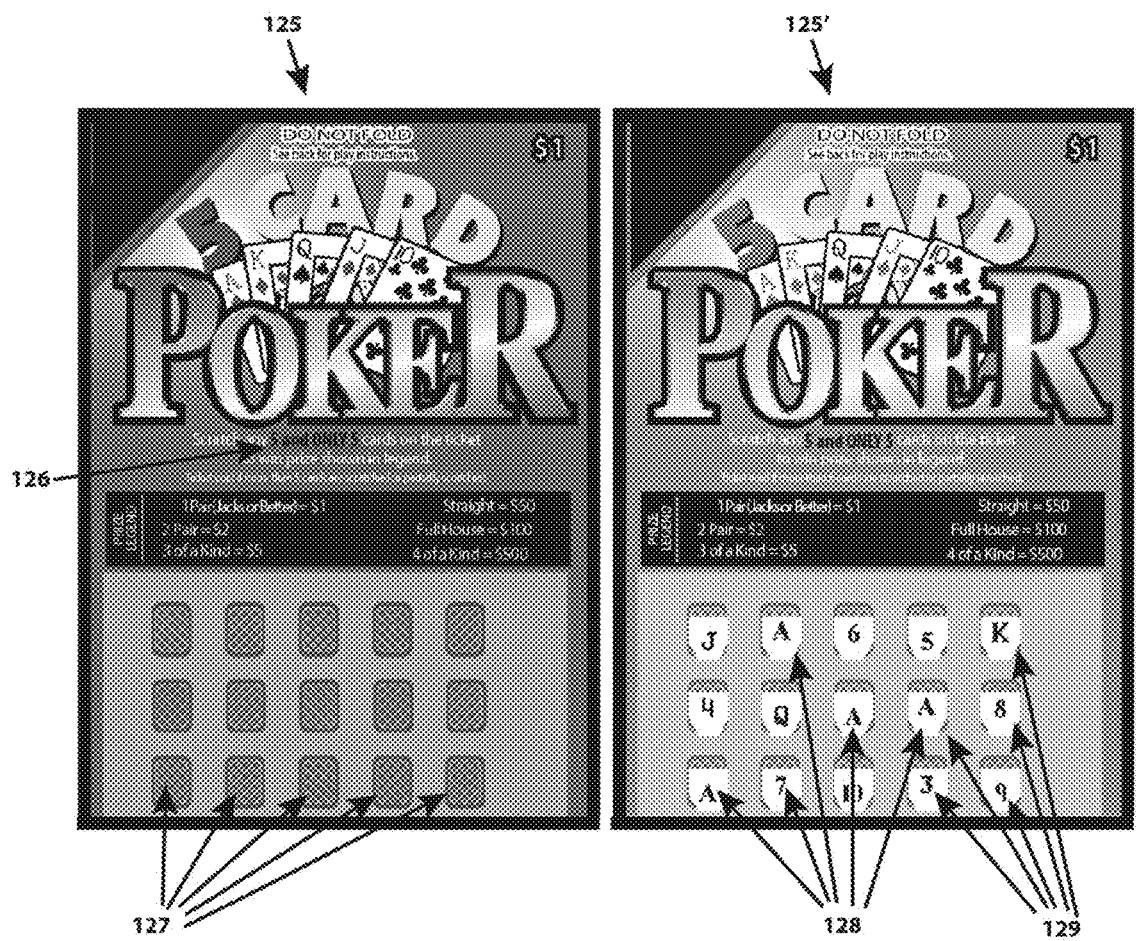
FIG. 1B is a front elevation view of a representative example of a traditional, prior art instant probability game ticket showing both its Scratch-Off Spots (SOS) intact and fully removed.

FIG. 1B depicts exemplary front elevation views of a prior art instant probability game i.e., virgin 125 and all scratch-off spots completely removed 125' instant probability game ticket views. As shown in FIG. 1B, to play the probability game the player removes any five 126 scratch-off spots 127 out of fifteen possible. If the player removes the correct sequence of five spots he or she will win a prize— e.g., 128, four Aces ("A") and a "7" resulting in a "4 of a Kind" prize with a value of "$500". Conversely, if the player removes a non-winning set of five spots 129, he or she may remove the remaining spots (ten as illustrated in 125 and 125') to prove that a prize could have been won with that particular instant probability ticket.

As described in the "Background" section above, instant probability games failed to be a commercial success primarily because an optimal balance was never obtained between "false rejects" 104 and "false accepts" 103 (FIG. 1A) when processing instant lottery probability tickets. This was generally because the instant probability game tickets were sold and handed directly to the player with no practical time limit given for the ticket to be played and redeemed. Consequently, illicit cheating attempts by nefarious players could be both time consuming and incorporate exotic technology resulting in ever increasing sensitivity 102 of the ticket redemption process to the point that too many "false rejects" 104 were generated for legitimately played tickets.

Figure 1C:
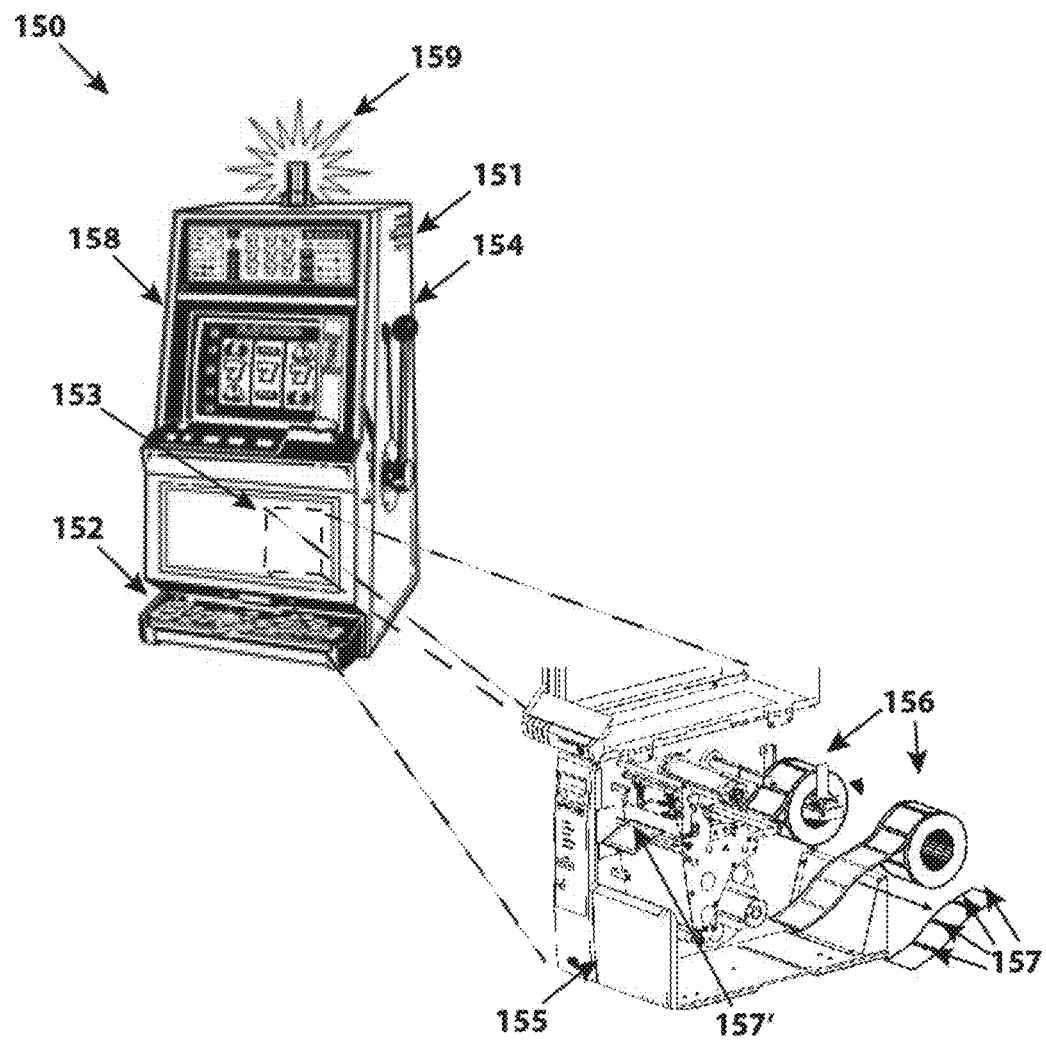
FIG. 1C is an exemplary isometric view of a prior art ITVM utilizing a paper roll of instant tickets to determine play outcome.

FIG. 1C depicts an isometric drawing 150 of a typical, prior art, ITVM 151 with its internal instant ticket dispenser and reader 155 highlighted as a blowup detail. As illustrated in the drawing 150, the ITVM 151 typically resembles a slot type machine; however, rather than have each play's outcome determined by a Random Number Generator (RNG) the outcome is typically determined by a preprinted set of instant tickets or pull-tabs that are sequentially dispensed in a tray 152 to the player with each new play—illustrated in the example of drawing 150, a new play is initiated whenever the player pulls the ITVM's handle 154. Thus, with the prior art ITVMs 151, multiplicities of instant tickets or pull-tabs accumulate in a tray 152 within easy access for the player. However, as a practical matter, the player rarely removes the dispensed instant tickets or pull-tabs from the tray 152 since the game's win or lose result is displayed in an amusing fashion on the ITVM's display 158 and possibly beacon 159 with any winnings maintained in the ITVM's totalizer memory, thereby allowing the player to cash out with one receipt that is automatically printed when the player elects to conclude game play.

Often, as both security and paper savings measures, the dispensed instant tickets or pull-tabs simply embody printed encrypted barcode indicia with no corresponding human decipherable win or lose information, thereby making it less likely that a player would even bother to collect and dispensed instant tickets or pull-tabs. In some prior art embodiments, the dispensed instant tickets or pull-tabs are even deposited directly into an internal trash can and not made available to the player in an attempt to lessen clean up problems at the retail establishment hosting the ITVMs.

The internal instant ticket or pull-tab dispenser 155 is illustrated in a blow-up isometric illustration 153 in drawing 150. As shown in the drawing 150, the instant tickets or pull-tabs are typically stored as a spool of paper 156 with multiplicities of instant tickets or pull-tabs 157 printed on the paper spool 156. Thus, with each subsequent play initiated by the player, the dispenser 155 unravels the spool 156 one instant ticket or pull-tab's length, scans the associated barcode (not shown in FIG. 1C) passing the scanned data to a ITVM Central Processing Unit ("CPU"—not shown in FIG. 1C) for decryption and correspondingly play result display, and finally cutting the paper spool with the corresponding instant ticket or pull-tab 157' dispensed to the tray 152 or internal trash can.

Having concluded the discussion of prior art instant probability tickets and ITVMs, preferred embodiments of the present invention will now be disclosed. As will be apparent to one skilled in the art, the present invention overcomes the inherent disadvantages of instant probability tickets, particularly the vexing problem of achieving an optimal balance between "false rejects" 104 and "false accepts" 103 (FIG. 1A), by holding the purchased probability ticket in escrow in an internal region of an ITVM gaming machine until the player first commits to a selection of a probability game elements subset from a larger set of offered gaming elements. The commitment process effectively locks in the player's choices prior to the probability ticket being dispensed, thereby allowing the player to gain physical access to the probability ticket.

In the context of the present invention "internal region" is an area that is inaccessible to the player, specifically the term refers to a secure internal region of the ITVM gaming machine that holds a purchased probability ticket in escrow until the player commits to a subset selection of "game elements" from a larger possible set. As used herein, this ITVM escrowed "internal region" may be a separate physical area within the ITVM for holding the ticket securely, or the area of a prior art dispenser where a ticket is advanced and its associated machine readable variable indicia is decoded but not yet cut or released, or the area of a printer where a newly printed ticket is advanced but not cut from a paper roll. The significant concept being the escrow "internal region" of the ITVM holds the dispensed or printed ticket in a secure area that is inaccessible to the player after all the escrowed ticket's "game elements" are stored in ITVM memory but not known to the player. Once the player commits to a subset selection of "game elements" from the larger possible set, the ticket is cut or dispensed thereby releasing it from the "internal region" where it becomes physically accessible to the player.

In the cases of preprinted probability ticket embodiments (e.g., FIGS. 2A and 2B), the purchased preprinted ticket will systematically advance from a "first location" (where the roll, stack, or deck of preprinted tickets are stored pending sale) to the "internal region" described above after the player has purchased a probability game ticket for play. The purchased ticket thus automatically advances in a "conveyer" belt fashion from a pool storage of preprinted probability tickets (i.e., "first location") to the "internal region" where it is held in escrow. In the case of probability tickets printed on demand (e.g., FIG. 2C), the "first location" is the virgin paper roll. When the paper advances by the print head it becomes the purchased probability ticket ultimately being held in escrow in the "internal region," which can be a separate device or simply the output of the printer before the printed ticket is cut from the roll. Again, the same concept is provided of the ticket advancing in a "conveyer" belt fashion from raw materials (i.e., "first location") to becoming a purchased probability ticket via the print head, and ultimately to the "internal region" where it is held in escrow until the player commits to a selection of game elements.

The player typically makes a "selection" by interacting with a player input such as a touch screen or other similar electronic display on the ITVM gaming machine where the "selection" process specifies the subset of "game elements" the player wishes to commit to play. Once the player completes and commits to a "selection," the previously purchased instant probability ticket is immediately "dispensed" such that the player gains physical access to the ticket. Typically, this dispensing process involves automatically transporting the purchased probability ticket from the secure "internal region" of an ITVM gaming machine to its player accessible tray. Additionally, the "game elements" that the player selects are typically facsimiles of the winning and losing variable indicia printed on the instant probability ticket as shown on the ITVM's display. Finally, in the framework of the present invention, the terms "ITVM" and "gaming machine" are used interchangeably and sometimes used together—i.e., "ITVM gaming machine".

Selling and dispensing instant probability tickets in a secure and economically viable fashion requires segmentation, synchronized release of information, and coordination. By holding the purchased instant probability game ticket in escrow in a secure internal region of the ITVM gaming machine that is inaccessible to the player until a selection is made, efficiencies in game production, audit, security, and ergonomics can be realized. Abstraction of the variable ticket indicia into game elements that are digitally displayed on the ITVM gaming machine for selection and commitment by the player greatly reduces the security problems typically associated with instant probability tickets and consequently creates a new secure and ergonomic system that can be routinely audited without inconveniencing the player. Ideally, the probability game enabled ITVM gaming machines are networked to a central site, thereby allowing for further enhancements of security with real time audits.

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as coming within the scope and spirit of the invention.

Figure 2A:
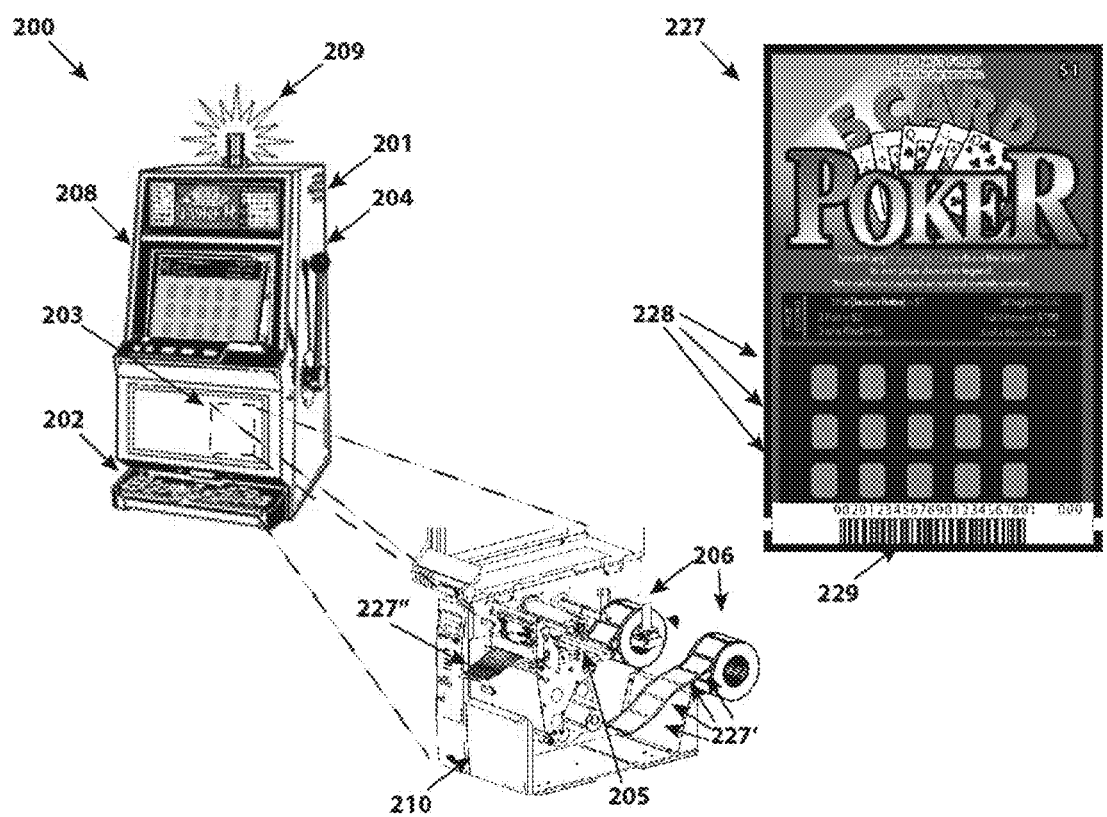
FIG. 2A is a first representative example of the isometric view of the ITVM of FIG. 1C adapted to become a gaming machine accepting instant preprinted probability game tickets as well as an example of instant probability game tickets that are loaded into the machine.

The inherent disadvantages of traditional instant probability games are overcome with the invention 200 depicted in FIG. 2A. As illustrated in FIG. 2A, the invention 200 embodied in ITVM gaming machine 201 appears to the player similar to prior art ITVM 151 (FIG. 1C) with the exception that the game play style has changed to allow the player to commit to a subset selection of game elements from a probability ticket 227 (FIG. 2A) superset of spots preferably with an interactive digital touch screen 208. With the probability game dispensing invention embodied in ITVM 201, an actuation handle or button 204 enables the player to commit to a specified selection of game elements that were selected from the display 208. Once the commitment is made, the winning or losing status of the game play is revealed on the same display 208 that selection occurred from the probability ticket 227 dispensed to the tray 202, and optionally via a beacon 209 for high-tier winners (e.g., 128 "4 of a Kind" in FIG. 1B).

In a general embodiment, the probability ITVM 201 gaming machine's internal dispensing mechanism 210 (illustrated in a blow-up isometric from 203) is modified to decode the machine readable indicia 229 on the probability ticket and then hold the decoded ticket 227" in escrow in the internal region of the ITVM 201 that is inaccessible to the player. With this embodiment, the probability tickets are typically stored as a spool 206 with multiplicities of instant probability tickets 227' printed on the paper spool 206. Thus, with each subsequent purchased play initiated by the player, the dispenser 228 unravels the spool 206 one instant probability ticket's 227' length in a conveyer belt fashion 205, scanning and decoding the associated machine readable barcode indicia 229 to determine the precise arrangement of the printed game elements on the ticket, and then holding the ticket 227" in its internal region in escrow until the player commits to a selection of game elements as shown on the ITVM gaming machine's display 208. While the probability ticket 227" is held in the internal region, the decoded barcode indicia scanned data is transferred to the ITVM CPU (not shown in FIG. 2A) for decryption and correspondingly display of the game elements in a covered form on screen 208—i.e., without revealing the variable indicia 228 printed on the ticket 227". The internal region holds the probability ticket 227" where it remains inaccessible until the player makes and commits to a selection of gaming elements. Once the player commits to his or her selection by actuating the probability game ITVM 201 gaming machine handle 204, the display 208 reveals facsimiles of the variable printed indicia 208 on the probability ticket 207" previously in escrow, also highlighting if the player's committed selection corresponded to a winning combination of indicia on the purchased probability ticket 227". At the same time, the internal region releases the purchased probability ticket 227" by cutting the ticket from the spool causing the ticket to free fall to the ITVM gaming machine's tray 202 and therefore become accessible to the player.

Thus, with the ITVM gaming machine 201 new and unique probability game play is enabled, potentially expanding sales and increasing the customer base. Since the probability ticket is secured in an internal region of the ITVM gaming machine until the player commits to a subset selection from a larger set of gaming elements, the security of the system is derived from the probability ticket being held in escrow, inaccessible to the player until a selection is committed. Consequently, the security tradeoffs between "false accepts" 103 (FIG. 1A) and "false rejects" 104 that were problematic in the past are greatly mitigated. In the prior art, the player was allowed to gain physical access to probability tickets without first committing to a selection. However, with the present invention 200 (FIG. 2A) this prior art paradigm is eliminated in favor of a security model that is primarily based on the integrity of the ITVM gaming machine's 201 cabinet. This cabinet-based security model is well known and hardened over a century by both ITVMs as well as slot machines while in constant use. Additionally, the nature of a gaming machine embodied in a cabinet, typically means that player access to the cabinet itself is somewhat restricted and only granted in a public place, thereby eliminating or greatly mitigating illicit experimentation in private. As a result, the "false accepts" 103 and "false rejects" 104 tradeoffs of FIG. 1A inherent in any security system shift to being concerned with the player illicitly gaining access to the internal workings of the gaming machine's stationary cabinet. When compared to the previous, prior art security model of the probability tickets being essentially portable with the player purchasing and carrying unplayed tickets to other locations, the benefits of the relatively static cabinet based probability ticket dispensing security model are significant.

In the embodiment described above, all of the probability tickets include potential winning game elements, meaning that every ticket is a potential winner. In an alternative embodiment, forced losing tickets (i.e., where it is impossible to win no matter what selection of game elements a player chooses) are intermingled with true probability tickets in the same batch or spool containing at least a portion of probability tickets. Thus, only a subset of the probability tickets include potential winning game elements. In yet another alternative embodiment, forced winning tickets (i.e., where it is impossible to lose no matter what selection of game elements a player chooses) are intermingled with true probability tickets and optionally forced losing tickets in the same batch or spool containing at least a portion of probability tickets.

While the previous general embodiment 200 (FIG. 2A) has the advantage of potential backward compatibility with existing ITVM designs it has the disadvantage of potential security vulnerabilities from an illicit human installer gaining a priori knowledge of the order that the preprinted probability tickets will be dispensed. For example, the illicit installer could simply photograph the first few (e.g., ten) probability tickets on a roll during the installation process. The illicit installer could then close the cabinet, start the gaming machine, purchase and play the probability game(s) associated with the first few tickets committing to selections of subsets of gaming elements that he or she knew a priori to be winning combinations.

There are several possible embodiments to mitigate this form of illicit installer attacks. In one embodiment, the roll of tickets 206 is shipped and installed in a secure package that includes a leader line of paper that is of sufficient length to be threaded through the dispenser 210 and conveyer without revealing any probability tickets from the secure packaging. With this embodiment, the installer would insert the secure package, thread the leader line and close the cabinet. After the cabinet door was closed the gaming machine would automatically advance the leader line to the point that the first printed probability ticket 227" was detected. At that point, the leader line would be cut off with the leader line waste falling into the tray 202 for removal by the installer. The security of this embodiment against illicit installer fraud being derived from the integrity of the packaging.

However, this embodiment has several disadvantages. First, security packaging can be expensive and could conceivable add significant costs since the packaging is most likely disposable. Secondly, secure packaging may not secure probability tickets already threaded through the dispenser if the gaming machine cabinet is reopened for whatever reason. Finally, the security of any form of packaging is notoriously questionable with experts in the field (e.g., Los Alamos National Laboratory) repeatedly citing "there is no such thing as secure packaging."

In another related embodiment, immediately after the gaming machine cabinet was opened and closed and secured, a random number of probability tickets would be dispensed without purchase after installation. These dispensed tickets would be disposed of with their serial numbers invalidated in the gaming machine's memory as well as any networked central site. This random dispensing process would theoretically obfuscate the identity of the first probability ticket to be available for purchase. However, this embodiment has the obvious disadvantage of wasted tickets with possibly minimal security gains—e.g., it is theoretically possible that an illicit installer could have a priori knowledge of all tickets on a roll 206. Of course, this embodiment could be implemented with the previous secure packaging embodiment for higher theoretical security. However, the costs would be greater and ultimately any vulnerability in the secure packaging itself could still theoretically compromise the composite system's security.

In another embodiment, the roll of probability tickets 206 would be shipped with all human readable variable indicia covered with a Scratch-Off Coating (SOC) 228 as shown in FIG. 2A ticket magnification 227 that is similar to existing scratch-off lottery tickets. Accordingly, in this embodiment the player would expect to receive a pristine (i.e., unscratched) probability ticket dispensed after committing to a selection. However, this embodiment has the disadvantages of added costs with the possibility of the illicit installer simply removing the SOC from the first few probability tickets he or she intended to purchase and again playing with a priori knowledge of the gaming elements printed indicia on those tickets.

Thus, in a preferred embodiment the ITVM's internal region would also include a scanning mechanism (e.g., camera, fluorescent detection of intact SOC, circuitry embedded in the SOC) to verify that the dispensed ticket SOC sold was in pristine condition. While not perfect security, the known methods of illicitly peaking under a SOC (e.g., "pin prick", "mechanical lift" attacks) to derive the variable indicia in an undetected manner are labor intensive and require a certain level of skill that may serve to mitigate illicit installer fraud. Additionally, the sensitivity levels 102 (FIG. 1A) of any internal region SOC scanning mechanism could theoretically be set to higher levels since the potential problems of "false rejects" 104 is somewhat mitigated due to the scanning occurring at the time of sale and therefore prior to player handling. However, this embodiment has the disadvantages of added costs and complexity both in terms of the probability tickets and associated scanning mechanism, possibly requiring different software for the SOC scanner whenever a new probability game design is introduced.

Figure 2B:
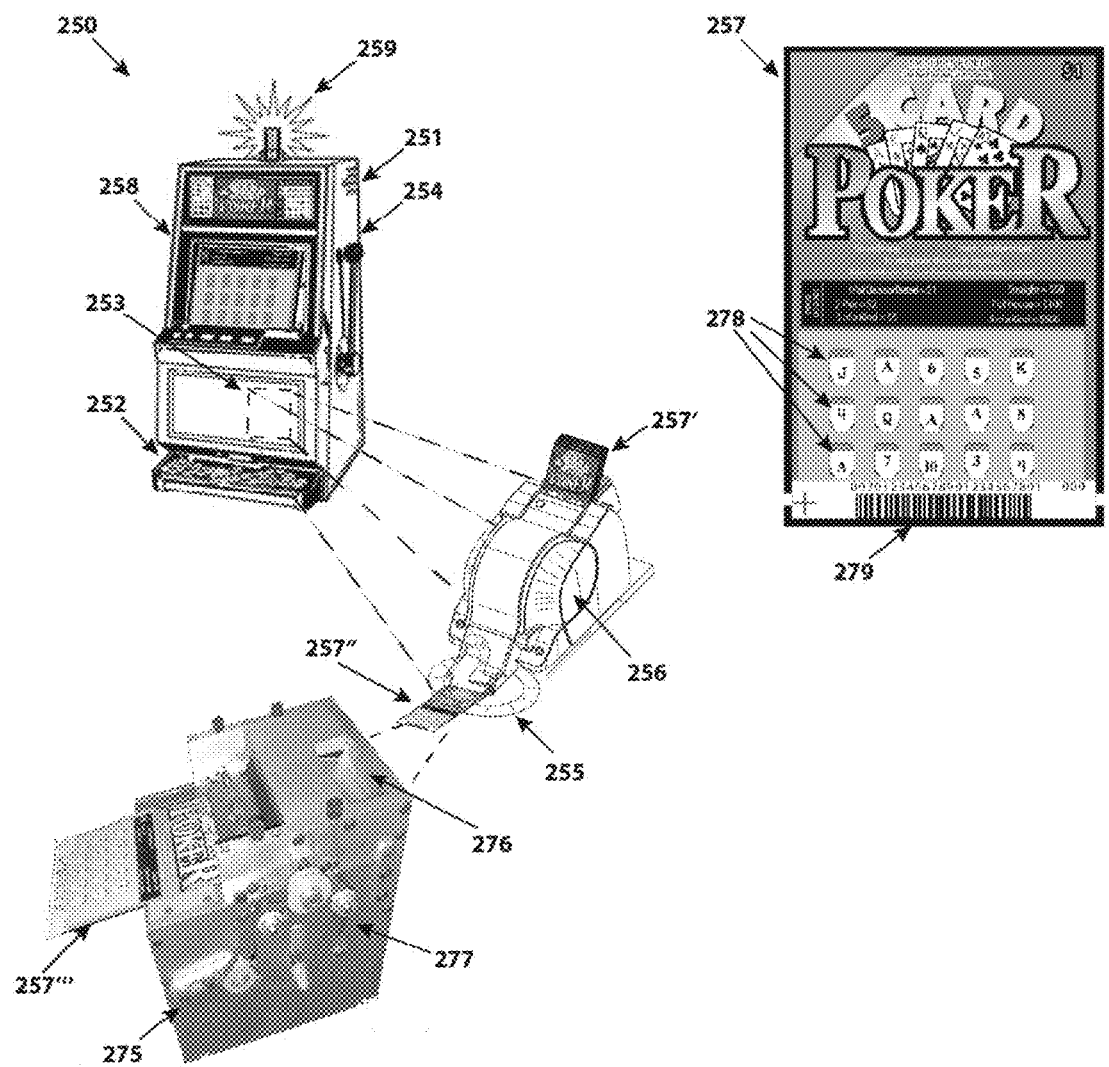
FIG. 2B is a second representative example of the isometric view of the ITVM of FIG. 1C adapted to become a gaming machine accepting instant preprinted probability game tickets as well as an example of instant probability game tickets that are loaded into the machine.

In an alternative embodiment 250 of FIG. 2B, the printed probability tickets 257 are individually cut and packed in sleeves or decks 257'. With this embodiment, the installer places the sleeve or deck 257' of probability tickets into the gaming machine 251 and closes and locks the cabinet. Once the cabinet door is closed and locked, some form of mechanical shuffling mechanism 255, well-known in the art (e.g., U.S. Pat. No. 1,157,898 (Perret); U.S. Pat. No. 2,692,777 (Miller); U.S. Pat. No. 4,832,342 (Plevyak et al.); U.S. Pat. No. 6,299,167 (Sines et al.); and U.S. Pat. No. 7,677,566 (Krenn et al.), each of which are incorporated by reference herein), will randomly or pseudorandomly shuffle or rearrange the installed probability tickets such that the order the tickets will be dispensed can no longer be known a priori by the installer. Of course, this process would be repeated whenever the cabinet door was opened and closed.

As before, the invention 250 embodied in ITVM gaming machine 251 appears to the player similar to prior art ITVM 151 (FIG. 1C) with the exception that the game play style has changed to allow the player to commit to a subset selection of game elements from a probability ticket 257 (FIG. 2B) superset of spots preferably with an interactive digital touch screen 258. With the probability game dispensing invention embodied in ITVM 251, an actuation handle or button 254 enables the player to commit to a specified selection of game elements that were selected from the display 258. Once the commitment is made, the winning or losing status of the game play is revealed on the same display 258 that selection occurred from the probability ticket 257 dispensed to the tray 252, and optionally via a beacon 259 for high-tier winners (e.g., 128 "4 of a Kind" in FIG. 1B).

In this embodiment, the probability ITVM 251 (FIG. 2B) gaming machine's internal dispensing mechanism 255 (illustrated in a blow-up isometric from 253) is modified to include mechanical shuffling mechanism 255 plus an additional separate internal region 275 (illustrated in a blow-up isometric from 253) that is also inaccessible to the player. With this embodiment, the probability tickets 257' are first placed into the shuffler 255 by the installer and subsequently shuffled or rearranged after the ITVM gaming machine's 251 cabinet is closed and locked such that the order that each probability ticket 257" dispensed will be transferred in conveyer 255 such that the output sequence will be randomized in an unpredictable manner from the load sequence. When the probability ticket 257" is fed into the subsequent internal region 275, a barcode reader 276 scans the associated machine readable barcode indicia 279 passing the scanned data to a ITVM CPU for decryption and correspondingly display of the game elements in a covered form on screen 258—i.e., without revealing the variable indicia 278 printed on the ticket 257". The internal region 275 holds the probability ticket 257' where it remains inaccessible until the player makes and commits to a selection of gaming elements. Once the player commits to his or her selection by actuating the probability game ITVM 251 gaming machine handle 254, the display 258 reveals facsimiles of the variable printed indicia 278 on the probability ticket 257'" previously in escrow, also highlighting if the player's committed selection corresponded to a winning combination of indicia on the purchased probability ticket 257'. At the same time, the internal region 275 releases the purchased probability ticket 257''' from escrow with a mechanical conveyer advancement mechanism 277 causing the ticket to free fall to the ITVM gaming machine's tray 252 and therefore become accessible to the player.

With this embodiment, preprinted probability tickets 257 could be supplied either with or without a SOC covering since the security is primarily derived from the physical shuffle after the cabinet is secured. This preferred embodiment has the advantage of very high security against illicit installer insider fraud with the disadvantages of added mechanical complexity and costs associated with the shuffler as well as limited backward compatibility with existing ITVM dispensers.

In another alternative embodiment, both the security problems and added complexity and costs of the previous embodiments are mitigated or eliminated primarily with the utilization of printing probability tickets on demand, also referred to in the art as "print on the fly."

Figure 2C:
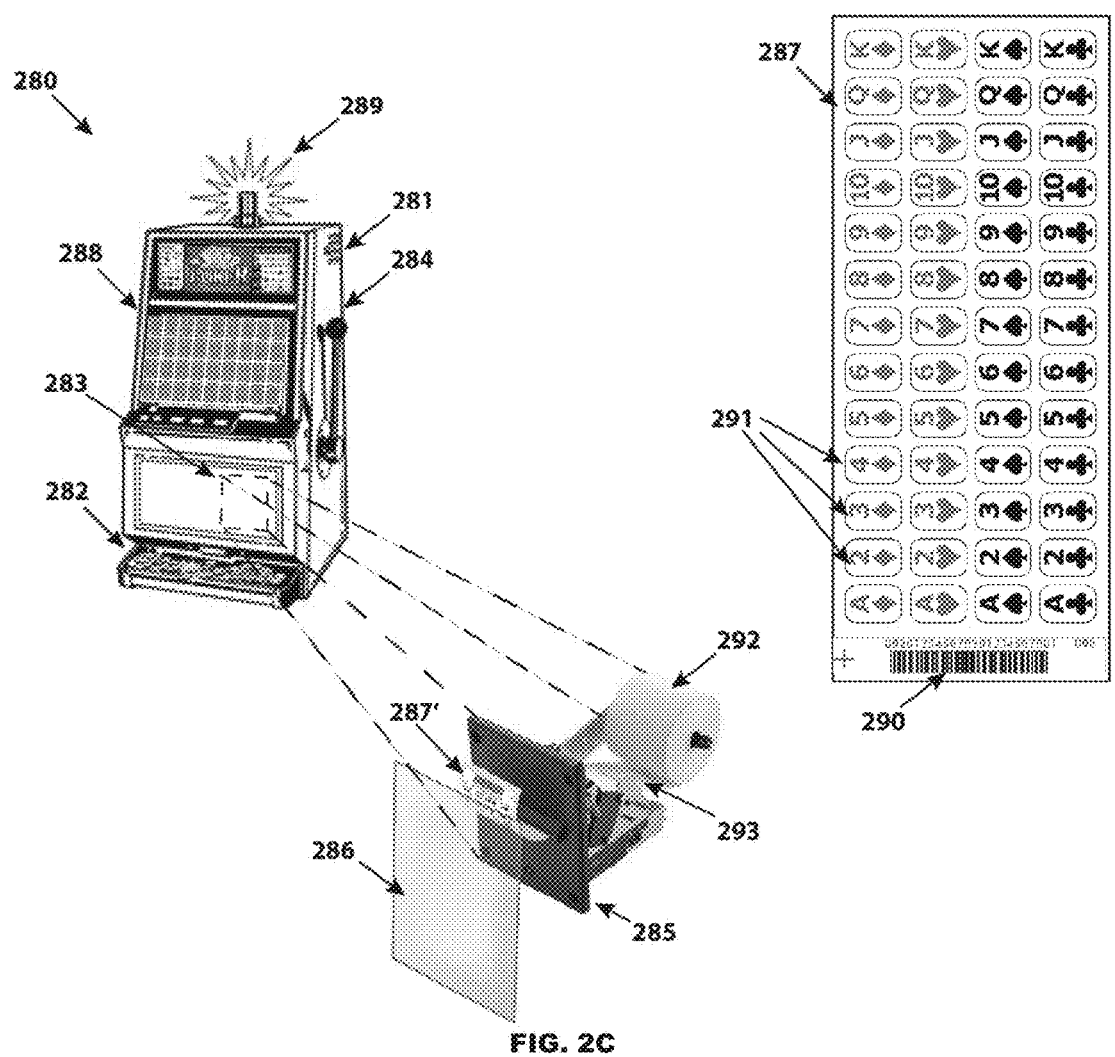
FIG. 2C is a third representative example of the isometric view of the ITVM of FIG. 1C adapted to become a gaming machine that prints probability game tickets on demand as well as an example of instant probability game tickets that are printed by the machine.

FIG. 2C provides an exemplary isometric view 280 of this printing on demand alternative embodiment. As illustrated in FIG. 2C, the invention 280 embodied in ITVM gaming machine 281 appears to the player to be similar to prior art ITVM 151 (FIG. 1C) with the exception that the game play style has changed to allow the player to commit to a subset selection of game elements from a probability ticket 287 (FIG. 2C) superset of game elements preferably with an interactive digital touch screen 288. With the probability game dispensing invention embodied in ITVM 281, an actuation handle or button 284 enables the player to commit to a specified selection of game elements that were selected from the display 288. Once the commitment is made, the winning or losing status of the game play is revealed on the same display 288, and optionally on the gaming machine's high tier beacon 289, with the probability ticket 287' dispensed to the tray 282 for physical examination by the player.

However, in this example, the probability ITVM 281 gaming machine's internal dispensing mechanism 285 (illustrated in a blow-up isometric from 283) is a thermal printer printing the probability ticket on demand 287' from a plain paper roll 292 (blank paper stock) that conveyer 293 advances past a print head to an internal region. Thus, with this embodiment 280, the probability tickets 287' are only printed when needed thereby eliminating illicit installer insider fraud. After the probability ticket is printed 287', it is held in an internal region (e.g., the output of the printer before the ticket 287' is cut from the roll 292) with the ITVM CPU displaying the game elements in a covered form on screen 288—i.e., without revealing the variable indicia 291 printed on the ticket 287'. The internal region holds the probability ticket 287' where it remains inaccessible until the player makes and commits to a selection of gaming elements. Once the player commits to his or her selection by actuating the probability game ITVM 281 gaming machine handle 284, the display 288 reveals facsimiles of the variable printed indicia 291 on the probability ticket 287' previously held in escrow highlighting if the player's committed selection corresponded to a winning combination of indicia on the purchased probability ticket 287'. At this time, the internal region releases the purchased probability ticket 287' from escrow by cutting the ticket 287' from the roll 292 causing the ticket to free fall to the ITVM gaming machine's tray 282 and therefore become accessible to the player.

While this embodiment 280 has the advantage of eliminating or greatly mitigating illicit installer insider fraud, it inherently has the disadvantage of a higher level of possible mistrust by the player and consequently reduced sales. This higher level of mistrust arises from the nature and appearance of printed on demand tickets. For example, one of the most economical ways of producing print on demand probability tickets 287' is to utilize a thermal printer 285 with thermal paper stock 292. However, the resulting monochromatic thermally imaged probability ticket 287' would readily appear to even the most casual player to have been spontaneously printed due to its resemblance to cash register receipts. Thus, from the player's perspective, the probability game could potentially be rigged in a dishonest way such that the ticket 287' is printed only after the player has committed to his or her selection of game elements, thereby completely bypassing any probability gaming aspect. This potential disadvantage in player perception can be eliminated or greatly reduced by allowing at least a portion of the probability ticket held in escrow 287' in the internal region of the gaming machine to be visible to the player 286—e.g., through a clear acrylic glass (e.g., Plexiglas®) window 286. Ideally, this visibility 286 of the printed probability ticket 287' while in escrow would allow the player to observe the ticket through his or hers' game element selection process as well as the entire trajectory of the released ticket as it travels (e.g., falls) from the internal region to the ITVM's tray 282 after the player commits to a selection. Thus, allowing the player to see portions of the purchased and unplayed printed probability ticket 287' could possibly increase the perceived integrity of the game and consequently its marketability. Of course, in this preferred embodiment, it is essential that the portions of the escrowed printed probability ticket visible to the player do not reveal the arrangement of game element indicia 291 printed on the ticket 287 and 287'. It should also be noted, that the visibility 286 of the internal region of the gaming machine to the player could also be utilized in other embodiments of this invention.

While FIG. 2C illustrates a machine readable barcode indicia 290 on the probability ticket (287 and 287'), it is not necessary to read and decode the machine readable indicia with this embodiment. This is because that the probability tickets 287 and 287' are printed on demand by the ITVM CPU, which consequently is already cognizant of the arrangement of variable indicia 291 on the printed probability ticket 287 and 287' with therefore no need for additional feedback from the ticket itself. Nevertheless, it is still desirable to print a machine readable and/or human readable inventory control number (also, referred to as 290) on the ticket 287 and 287' for potential future logistical and audit purposes. However, if there are legality issues in certain jurisdictions regarding print on demand tickets, the print on demand ticket may be printed with the same machine readable bar code indicia 290 as described in the preprinted embodiments, and the printed ticket may be scanned as described above to electronically retrieve the arrangement of game element indicia from the same memory location that dictated how the ticket should be printed in the first place. In this manner, a print on demand ticket is effectively treated by the ITVM as a preprinted ticket, thereby overcoming potential legality issues.

FIG. 2C illustrates a probability ticket 287 with fifty-two separate game element indicia symbolizing the fifty-two different cards found in a common deck of playing cards. Thus, there are multiple of potential games that are possible from this same style of probability ticket 287 e.g., player picks any five cards for a Poker hand, player picks Blackjack cards against a dealer's hand, player picks Solitaire draw cards. The familiarity of these game styles may further enhance the marketability of probability games. Additionally, the vast number of possible combinations and permutations for a fifty-two-card deck greatly simplify the ticket generation and shuffling process as well as allow for extremely high-tier prizes to be potentially winnable on every probability ticket 287—e.g., the odds of a player selecting a royal straight flush series of gaming elements indicia with five selections out of a possible set of fifty-two gaming elements are 649,739 to 1 or a probability of 0.000154%. Of course, probability tickets with fifty-two or more gaming elements are theoretically compatible with any of the ITVM gaming machine embodiments disclosed, not just the print or demand alternative embodiment.

Figure 3A:
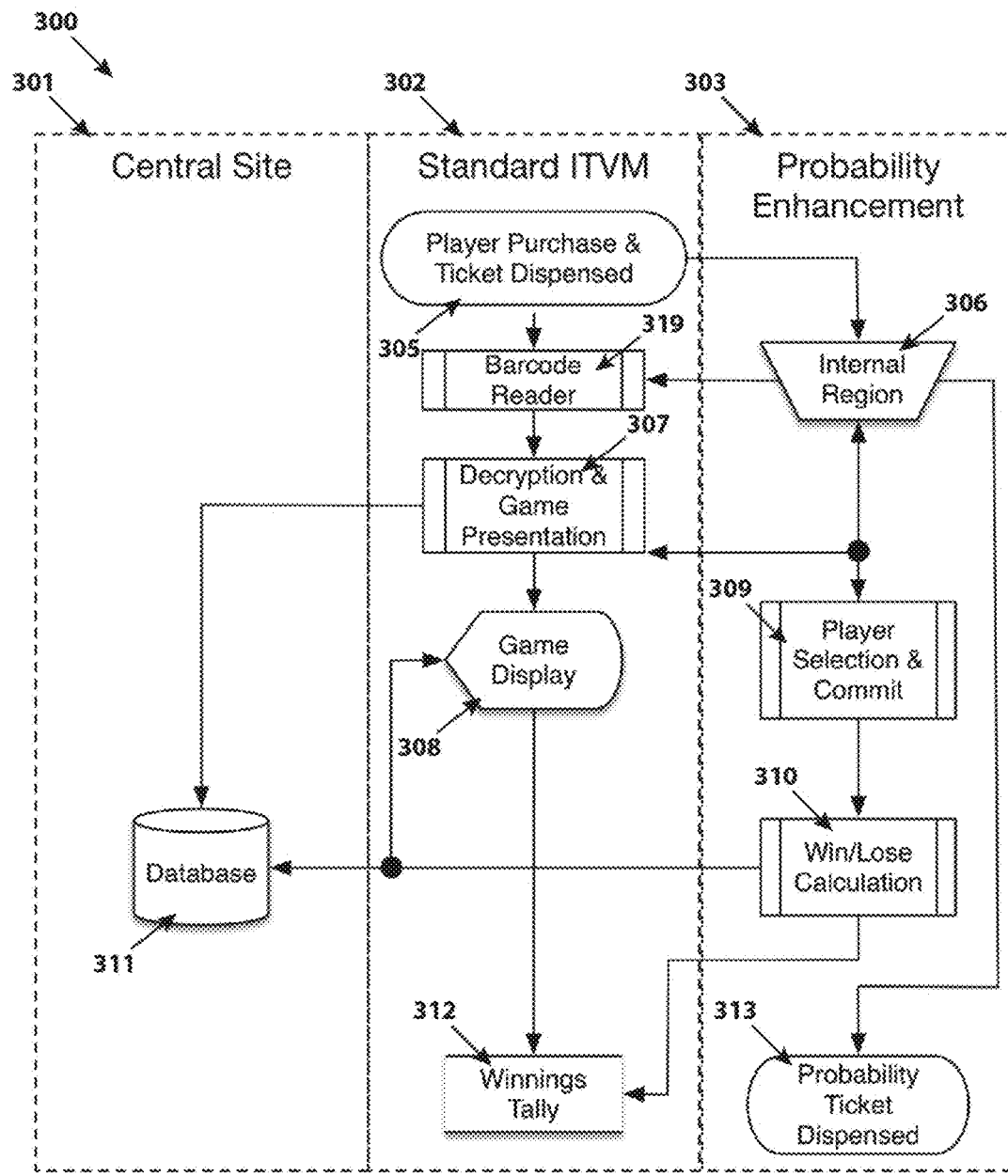
FIG. 3A is a flowchart of a representative example of an instant ticket probability ticket selection, sale, escrow holding, selection, and dispensing functionality of the gaming machine of FIG. 2A.
Figure 3B:
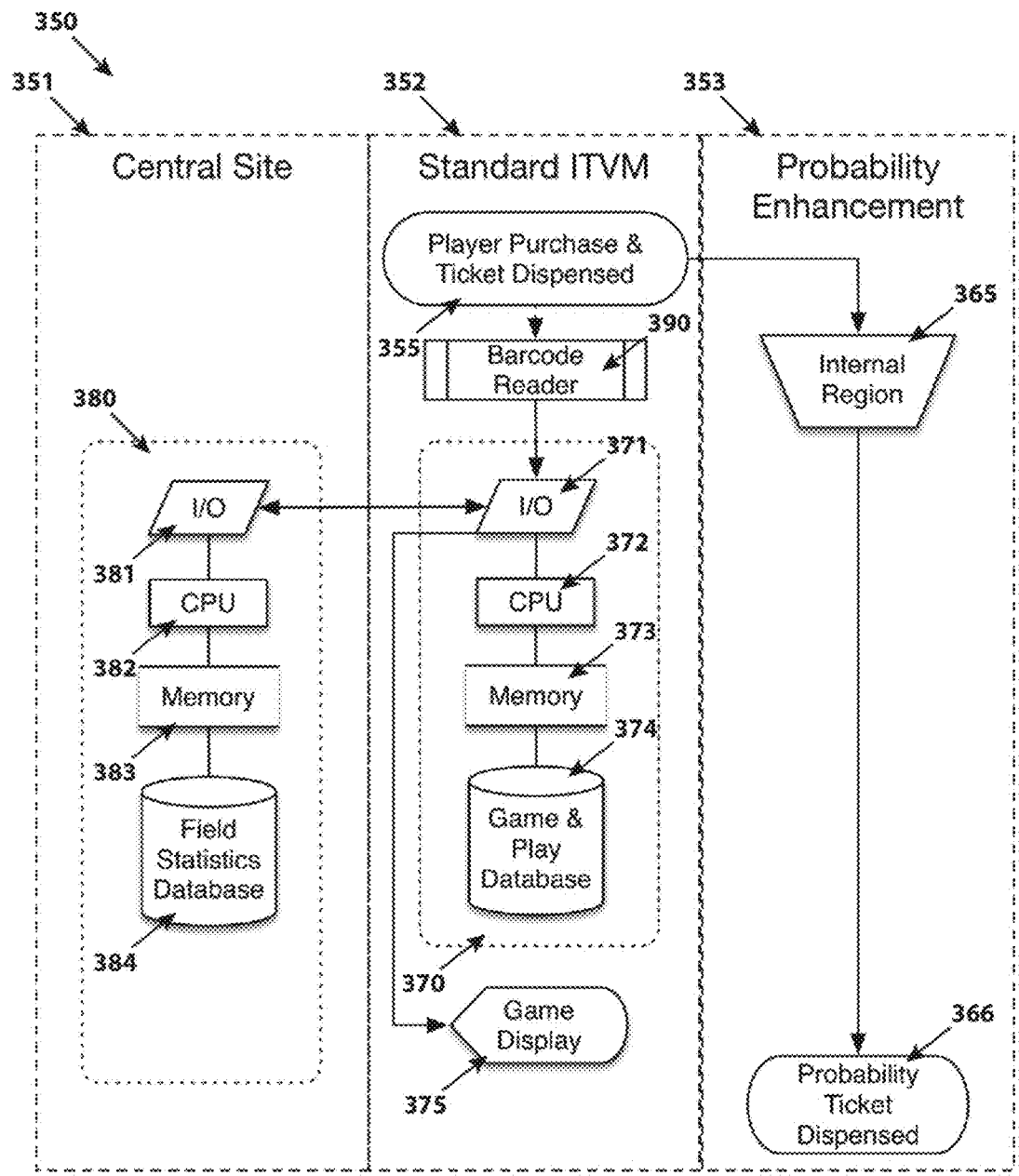
FIG. 3B is a hardware architecture diagram of a representative example of an instant ticket probability ticket selection, sale, escrow holding, selection, and dispensing functionality of the gaming machine of FIG. 2A and FIG. 3A.

FIGS. 3A and 3B, taken together, illustrate the same probability gaming machine's embodiment system level flowchart and associated hardware architecture diagram for the invention 200 disclosed in FIG. 2A. As illustrated in the swim lane flowcharts 300 and 350 of FIGS. 3A and 3B, this embodiment of the invention is conceptually divided into three groups (i.e., "Central Site" 301 and 351, "Standard ITVM" 302 and 352, and "Probability Enhancement" 303 and 353) by the three "swim lane" columns as shown in the two figures. If a particular flowchart function appears completely within a swim lane, its functionality is limited to the data category of the associated swim lane—e.g., "Player Purchase & Ticket Dispensed" 305 and 355 is within "Standard ITVM" functionality 302 and 352 in both figures.

FIG. 3A swim lane flowchart 300 begins with the player purchasing a probability game ticket and the ticket being dispensed 305. With a traditional (prior art) ITVM gaming machine, the machine readable indicia on the dispensed regular ticket would be read by a barcode reader 319 during the dispensing process with the decoded data being passed to the gaming machine's CPU for decryption 307 and subsequent game presentation on the display 308 with the game's outcome determined by the decrypted barcode data. The dispensed ticket would then fall into the prior art gaming machine's tray 252 (FIG. 1C) with the game and eventual outcome displayed on the gaming machine's game display 308 (FIG. 3A).

Conversely, with the probability gaming machine of this invention, the purchased ticket passes into physical escrow being held (secure from physical access by the player) at the dispenser in an internal region 306 of the gaming machine that is typically the output of the dispenser, but not released to the consumer at this point. When conveyed to the internal region 306 of the gaming machine, the barcode reader 319 decodes the probability game ticket's machine readable indicia with the decoded data being passed to the gaming machine's CPU for decryption and subsequent game presentation 307 with the game display 308 illustrating a matrix of possible gaming elements for the player to make a selection of a subset of game elements from the superset displayed. The outcome of the game depends on the player's selection. Once the player makes the selection of the subset of gaming elements and commits to his or her selection 309, a probability game unique comparator process determines if the player's selection reveals a winning or losing series of indicia on the preprinted probability ticket 310. That is, the player-entered selections are electronically compared to the game elements of the probability ticket to determine if the player entered winning selections. Once the winning or losing calculation 310 is completed, the results (along with the player's selection) are highlighted on the game display 308 with the revealed ticket indicia superimposed over the gaming elements previously displayed, thereby illustrating the probability ticket's variable indicia configuration as well as the player's selections. Optionally, in addition to providing the win or lose display data, the winning or losing calculation 310 results as well as player selections may also be transmitted to a central site 301 for recording in an audit and trending database 311. If a player wins a prize, the prize value will be credited to the player's running balance of winnings 312. Regardless of the win or lose outcome, at this point the probability ticket is dispensed to the player 313 for physical inspection and comparison. In this manner, the player obtains physical possession of the probability ticket which enables verification of the integrity of the game. The game elements are preferably maintained on the electronic display 308 after the probability ticket is dispensed 313, thereby further enabling verification of the integrity of the game by the player.

In the process described above, the player-entered selections are stored in a memory of the gaming machine. A comparator in the gaming machine electronically compares the player-entered selections to the game elements of the probability ticket to determine if the player entered winning selections and causes the electronic display to inform the player whether winning selections were made. The memory and comparator may be part of the gaming machine's memory 373 and CPU 372, (FIG. 3B) respectively.

As before, the FIG. 3B swim lane system architecture diagram 350 begins with a player purchasing a probability game ticket and the ticket being dispensed 355. Again, with the traditional (prior art) ITVM gaming machine, the machine readable indicia on the dispensed regular ticket would be read by a barcode reader 390 during the dispensing process with the decoded data being passed to the internal digital processor 370, through the Input/Output (I/O) interface 371, to the gaming machine's CPU 372, and associated memory 373 for decryption and subsequent game presentation generated from data stored in the game and play database 374. The generated game presentation is then routed from the CPU 372 through the I/O 371 to the cabinet's game display 375. The decrypted barcode data is also saved in the play database 374. The dispensed ticket would then fall into the gaming machine's tray 202 (FIG. 2A) with the game and eventual outcome displayed on the game display 375 (FIG. 3B).

However, with the probability gaming machine ITVM of 350, the purchased ticket passes into secure physical escrow in an internal region 365 of the gaming machine. Prior to being held in the internal region 365 the barcode reader 390 decodes the probability game ticket's machine readable indicia with the decoded data relayed to the gaming machine primary processor's 370 I/O 371, CPU 372, and memory 373 for decryption and subsequent game presentation generated from data stored in the game and play database 374. The game presentation is divided into different stages with the first stage being a presentation of a matrix of possible gaming elements for the player to select a subset of game elements from the superset illustrated on the game display 375. Once the player makes the selection and commits, a probability game unique comparator process runs on the CPU 372 to determine if the player's selection reveals a winning or losing series of indicia on the preprinted probability ticket held in escrow in the internal region 365. Once the winning or losing calculation is completed by the CPU 372, the results (along with the player's selection) are highlighted on the game display 375 with the revealed ticket indicia superimposed over the gaming elements previously displayed, thereby illustrating the probability ticket's variable indicia configuration as well as the player's selections. At this point, the ticket held in escrow in the internal region 365 is released 366 falling into the gaming machine's tray 202 (FIG. 2A) with the game and eventual outcome displayed on the game display 375 (FIG. 3B).

In addition to providing the win or lose display data, the CPU 372 also writes the results to its internal database 374. Optionally, these same results and decrypted ticket data may also be transmitted to a central site server's 380 I/O 381 for recording by its CPU 382 and memory 383 into an audit and trending database 384. The central site server 380 is also referred to herein as a "remote server."

Figure 4A:
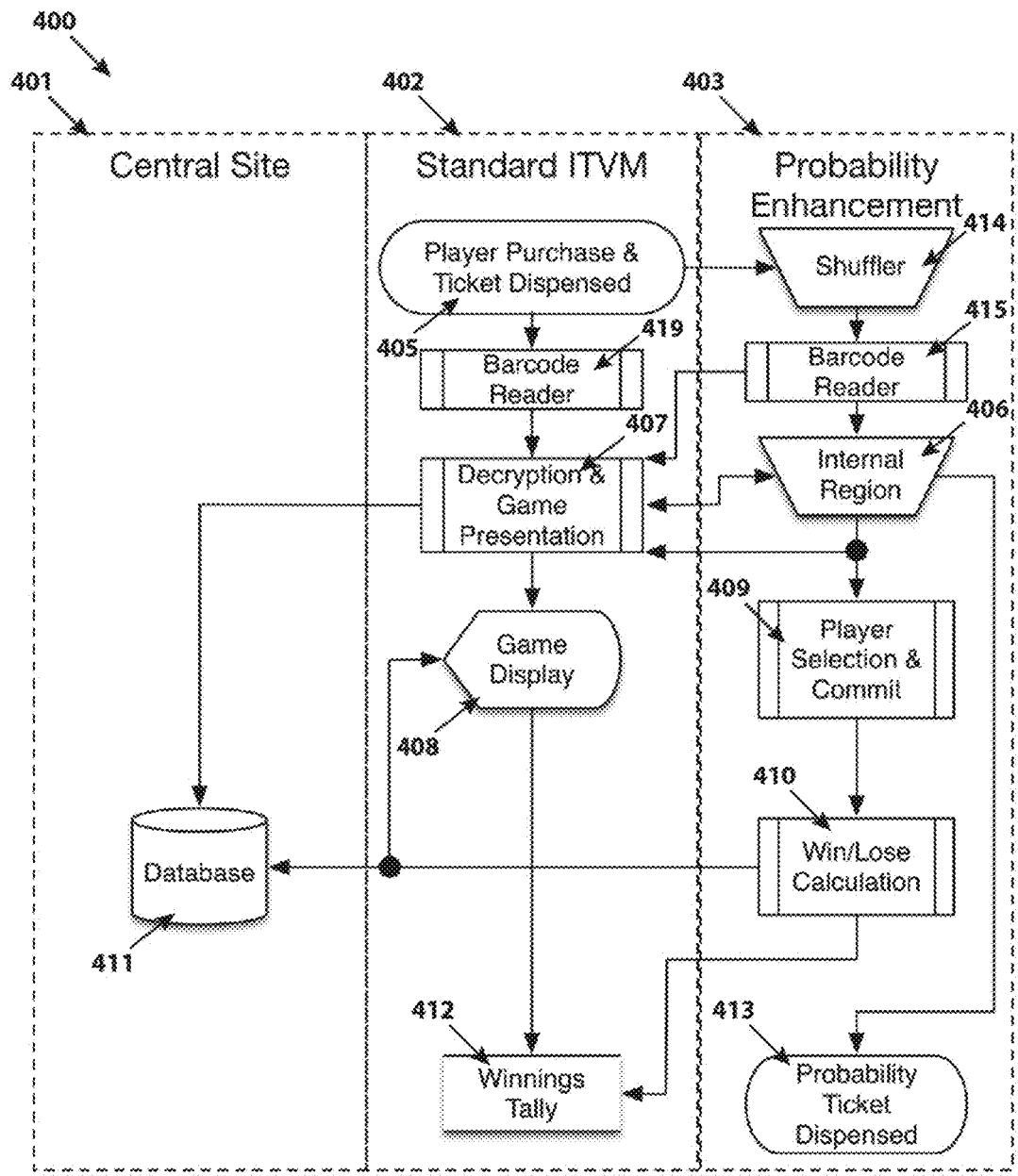
FIG. 4A is a flowchart of a representative example of an instant ticket probability ticket selection, sale, escrow holding, selection, and dispensing functionality of the gaming machine of FIG. 2B.
Figure 4B:
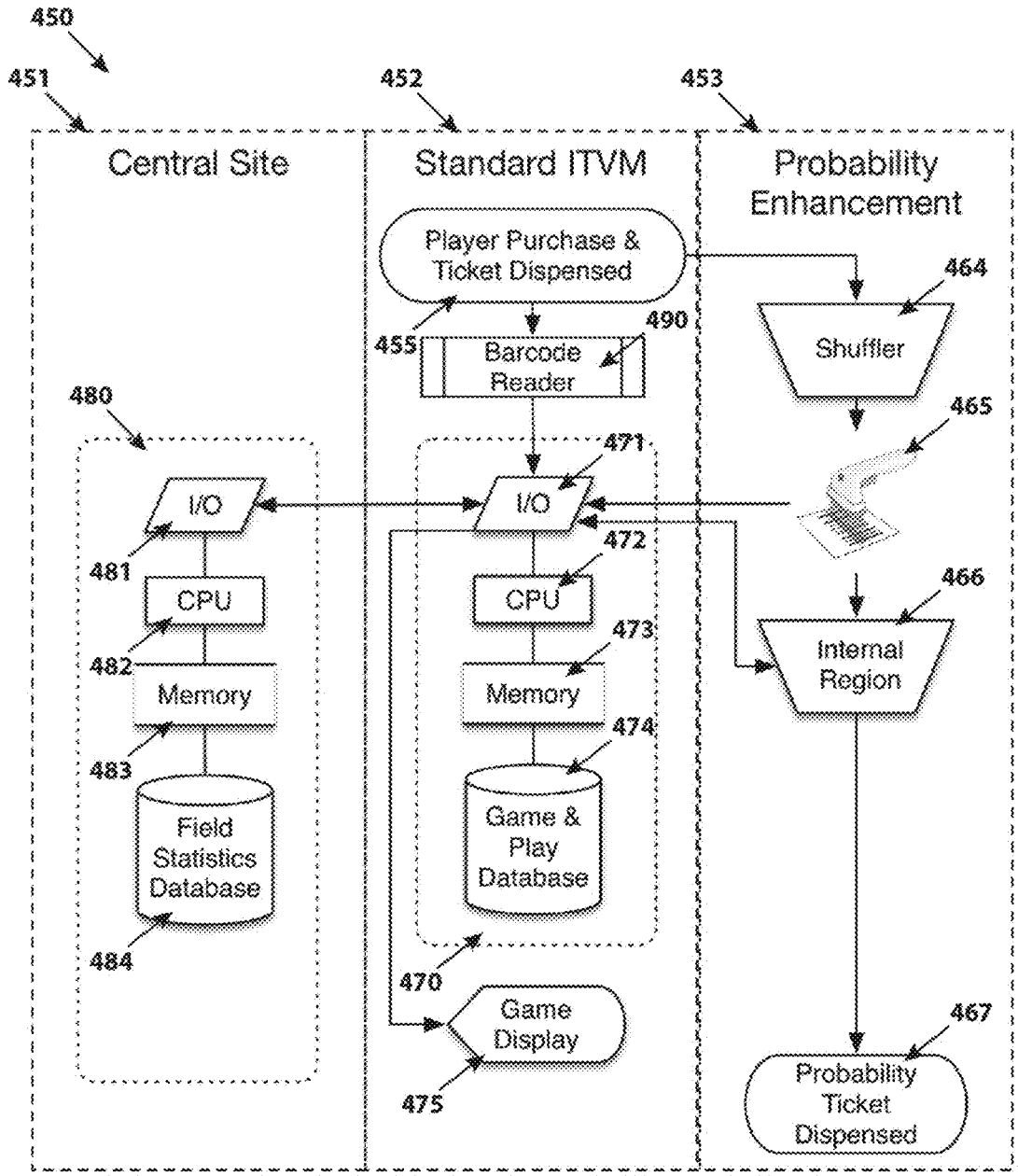
FIG. 4B is a hardware architecture diagram of a representative example of an instant ticket probability ticket selection, sale, escrow holding, selection, and dispensing functionality of the gaming machine of FIG. 2B and FIG. 4A.

FIGS. 4A and 4B, taken together, illustrate the same probability gaming machine's embodiment system level flowchart and associated hardware architecture diagram for the invention 250 disclosed in FIG. 2B. As illustrated in the swim lane flowcharts 400 and 450 of FIGS. 4A and 4B, as before this embodiment of the invention is conceptually divided into three groups (i.e., "Central Site" 401 and 451, "Standard ITVM" 402 and 452, and "Probability Enhancement" 403 and 453) by the three "swim lane" columns as shown in the two figures.

FIG. 4A swim lane flowchart 400 begins with the player purchasing a probability game ticket and the ticket being dispensed 405. Traditional (prior art) ITVM processing is similar to the discussion for FIG. 3A and will not be repeated here for the sake of brevity. With the probability gaming machine of this invention, the purchased ticket is conveyed from the shuffler 414 (FIG. 4A) to the internal region 406 in a random or pseudorandom fashion such that there can be no human decipherable link between the load order of the probability tickets and the sequence that the tickets are sold and dispensed. The conveyed ticket 257" (FIG. 2B) from the shuffler 414 (FIG. 4A) passes into physical escrow being held (secure from physical access by the player) in the internal region 406 of the gaming machine. When passed to the internal region 406 of the gaming machine, the probability game barcode reader 415 (the standard game barcode reader 419 is not used in this embodiment) decodes the probability game ticket's machine readable indicia with the decoded data being passed to the gaming machine's CPU for decryption and subsequent game presentation 407 with the game display 408 illustrating a matrix of possible gaming elements for the player to make a selection of a subset game elements from the superset displayed. The outcome of the game depends on the player's selection. Once the player makes the selection of the subset of gaming elements and commits to his or her selection 409, a probability game unique comparator process determines if the player's selection reveals a winning or losing series of indicia on the preprinted probability ticket 410. Once the winning or losing calculation 410 is completed, the results are highlighted on the game display 408 with the revealed ticket indicia superimposed over the gaming elements previously displayed. Optionally, in addition to providing the win or lose display data, the winning or losing calculation 410 results and player selections may also be transmitted to a central site 401 for recording in an audit and trending database 411. If a player wins a prize, the prize value will be credited to the player's running balance of winnings 412. At this point the probability ticket is dispensed to the player 413 for physical inspection and comparison.

With the probability modified gaming machine ITVM of 450 of FIG. 4B, the purchased ticket is conveyed 455 from the shuffler 464 and passes into secure physical escrow in an internal region 466 of the gaming machine. The internal region's 466 barcode reader 465 (the prior art barcode reader 490 is not used in this embodiment) decodes the probability game ticket's machine readable indicia and the decoded data is relayed to the gaming machine primary processor's 470 I/O 471, CPU 472, and memory 473 for decryption and subsequent game presentation generated from data stored in the game and play database 474. The game presentation is divided into different stages with the first stage being a presentation of a matrix of possible gaming elements for the player to select a subset of game elements from the superset illustrated on the game display 475. Once the player makes the selection and commits, a probability game unique comparator process runs on the CPU 472 and local memory 473 to determine if the player's selection reveals a winning or losing series of indicia on the preprinted probability ticket held in escrow in the internal region 465. Once the winning or losing calculation is completed by the CPU 472, the results (along with the player's selection) are highlighted on the game display 475 with the revealed ticket indicia superimposed over the gaming elements previously displayed, thereby illustrating the probability ticket's variable indicia configuration, as well as the player's selections. At this point, the ticket held in escrow in the internal region 465 is released 466 falling into the gaming machine's tray 252 (FIG. 2B) with the game and eventual outcome displayed on the game display 475 (FIG. 4B).

In addition to providing the win or lose display data, the CPU 472 also writes the results to its internal database 474. Optionally, these same results and decrypted ticket data may also be transmitted to a central site server's 480 I/O 481 for recording by its CPU 482 and memory 483 into an audit and trending database 484. The central site server 480 is also referred to herein as a "remote server."

Figure 5A:
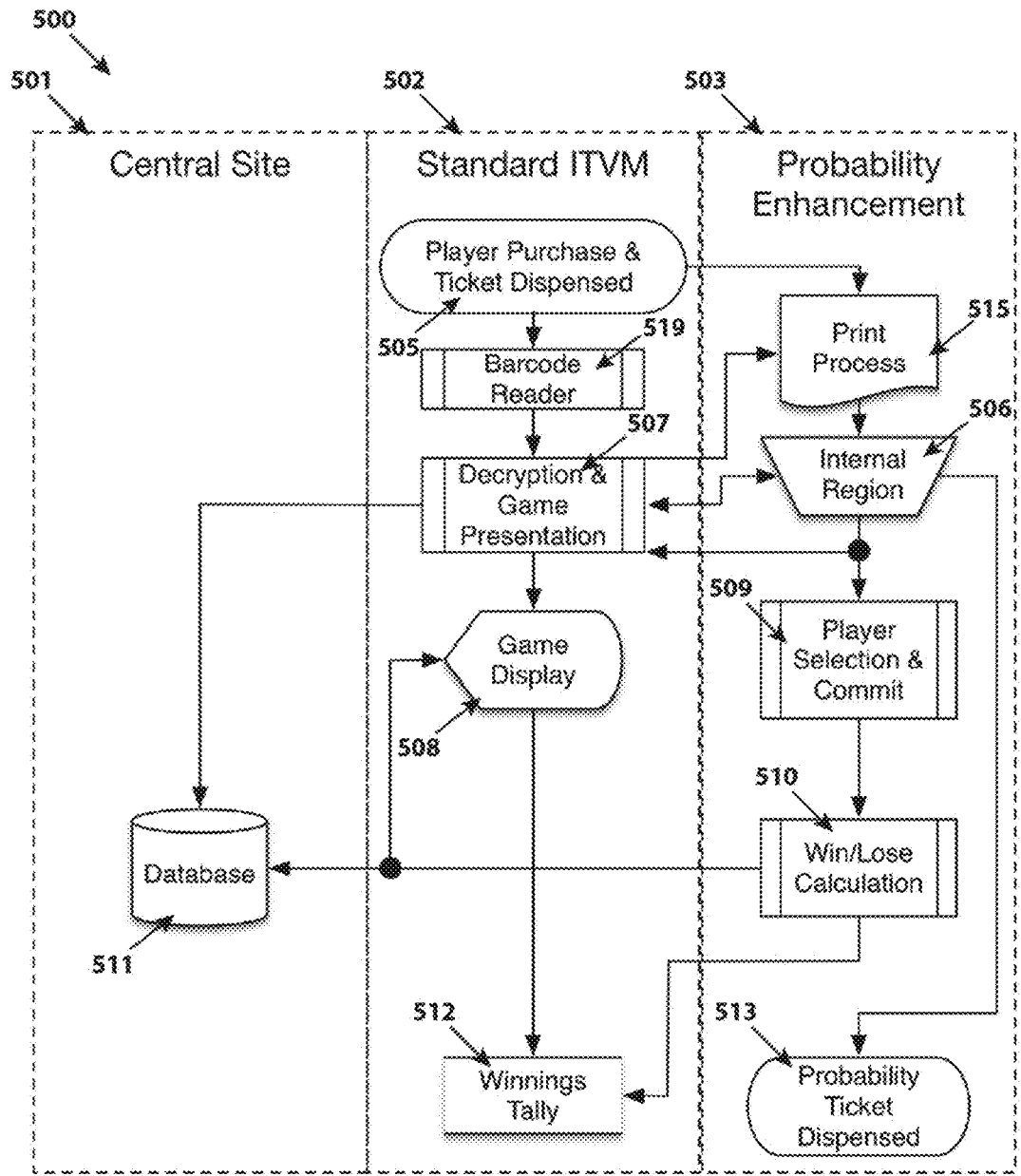
FIG. 5A is a flowchart of a representative example of an instant ticket probability ticket selection, sale, escrow holding, printing, and dispensing functionality of the gaming machine of FIG. 2C.
Figure 5B:
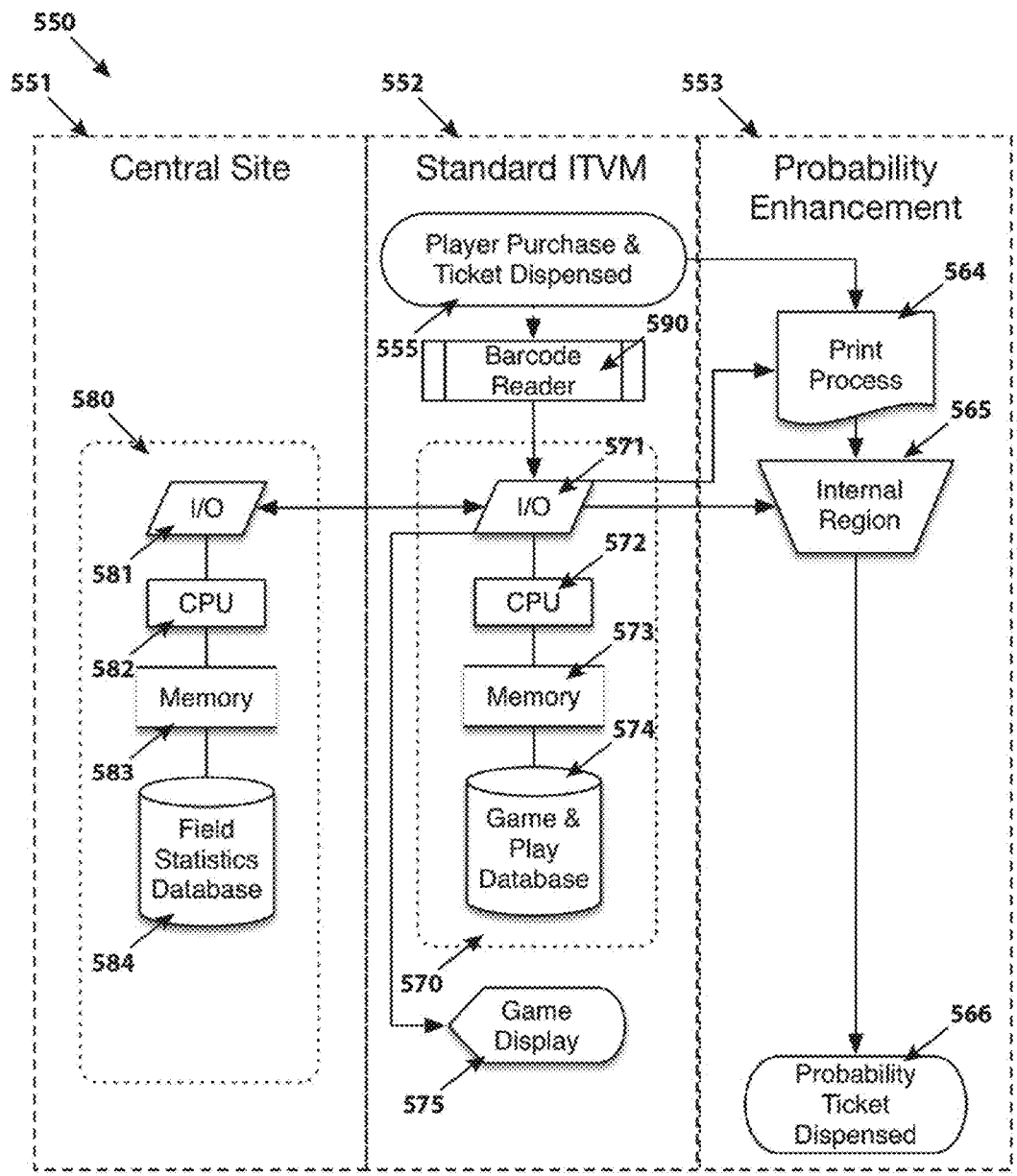
FIG. 5B is a hardware architecture diagram of a representative example of an instant ticket probability ticket selection, sale, escrow holding, printing, and dispensing functionality of the gaming machine of FIG. 2C and FIG. 5A.

FIGS. 5A and 5B, taken together, illustrate the same probability gaming machine's embodiment system level flowchart and associated hardware architecture diagram for the invention 280 disclosed in FIG. 2C. As illustrated in the swim lane flowcharts 500 and 550 of FIGS. 5A and 5B, as before this embodiment of the invention is conceptually divided into three groups (i.e., "Central Site" 501 and 551, "Standard ITVM" 502 and 552, and "Probability Enhancement" 503 and 553) by the three "swim lane" columns as shown in the two figures.

As before, the FIG. 5A swim lane flowchart 500 begins with the player purchasing a probability game ticket and the ticket being dispensed 505. With the probability gaming machine of this embodiment, the purchased ticket is printed on demand 515 and conveyed to escrow in an internal region 506 of the gaming machine—e.g., the output of the printer with the ticket not cut. The gaming machine's CPU synchronizes the print data with game presentation 507 with the game display 508 illustrating a matrix of possible gaming elements for the player to select a subset of game elements from the superset displayed. Since the gaming machine printed the probability ticket on demand, its processes are cognizant of the gaming elements indicia placement on the ticket and consequently barcode scanning 519 of the printed ticket machine readable indicia so as to retrieve the indicia placement from a storage (memory) location is optional. Once the player makes the selection of the subset of gaming elements and commits to his or her selection 509, a probability game unique comparator process determines if the player's selection reveals a winning or losing series of indicia on the preprinted probability ticket 510. Once the winning or losing calculation 510 is completed, the results are highlighted on the game display 508 with the revealed ticket indicia superimposed over the gaming elements previously displayed. Optionally, in addition to providing the win or lose display data, the winning or losing calculation 510 results and player data may also be transmitted to a central site 501 for recording in an audit and trending database 511. If a player wins a prize, the prize value will be credited to the player's running balance of winnings 512. At this point the probability ticket is dispensed to the player 513 for physical inspection and comparison.

Referring to the FIG. 5B probability modified gaming machine ITVM of 550, the purchased ticket is printed 555 by a print process 564 and is subsequently conveyed into secure physical escrow in an internal region 565 of the gaming machine. The internal region 565 holds the ticket (the prior art barcode reader 590 is not used in this embodiment), and the probability game ticket's data is relayed to the gaming machine primary processor's 570 I/O 571, CPU 572, and memory 573 for decryption and subsequent game presentation generated from data stored in the game and play database 574. The game presentation is divided into different stages with the first stage being a presentation of a matrix of possible gaming elements for the player to select a subset of game elements from the superset illustrated on the game display 575. Once the player makes the selection and commits, a probability game unique comparator process runs on the CPU 572 to determine if the player's selection reveals a winning or losing series of indicia on the printed probability ticket held in escrow in the internal region 565. Once the winning or losing calculation is completed by the CPU 572, the results (along with the player's selection) are highlighted on the game display 575 with the revealed ticket indicia superimposed over the gaming elements previously displayed, thereby illustrating the probability ticket's variable indicia configuration as well as the player's selections. At this point, the ticket held in escrow in the internal region 565 is released 566 falling into the gaming machine's tray 282 (FIG. 2C) with the game and eventual outcome displayed on the game display 575 (FIG. 5B).

In addition to providing the win or lose display data, the CPU 572 also writes the results to its internal database 574. Optionally, these same results and user selections may also be transmitted to a central site server's 580 I/O 581 for recording by its CPU 582 and memory 583 into an audit and trending database 584. The central site server 580 is also referred to herein as a "remote server."

In the print on demand embodiment illustrated in FIG. 2C, FIG. 5A and FIG. 5B, the probability gaming machine preferably receives the gaming elements for the currently purchased ticket that must be printed on demand from a highly secure source. In one embodiment, that source is memory in the central site 551 which prestores sets of gaming elements for probability tickets to be purchased and then printed, also referred to herein as "virtual probability tickets." In another embodiment, the memory that prestores the virtual probability tickets is a portable memory device, such as a flash memory card (e.g., memory stick), that is physically placed into the probability gaming machine by an installer. In this embodiment, communication preferably occurs with the central site 551 during game play so that the central site 551 can record which virtual probability ticket is being played and the player selections that are made.

It should be appreciated by those skilled in the art that various modifications and variations may be made present invention without departing from the scope and spirit of the invention. It is intended that the present invention include such modifications and variations as come within the scope of the appended claims.

What is claimed is:

1. A gaming machine that conducts a probability game and dispenses probability tickets, the gaming machine comprising:

(a) an internal region that holds undispensed probability tickets that are currently being played;
(b) an internal scanner that reads indicia on the next probability ticket to be dispensed that identifies game elements of the probability ticket;
(c) an electronic display that presents the game elements of the probability ticket;
(d) a player input that receives player-entered selections associated with the game elements of the probability ticket until game play is completed;
(e) a memory that stores the player-entered selections;
(f) a comparator configured to:
  (i) electronically compare the player-entered selections in the memory to the game elements of the probability ticket to determine if the player-entered selections are winning selections, and
  (ii) causes the electronic display to inform the player whether winning selections were made;
(g) a ticket dispenser that dispenses the probability ticket from the gaming machine when the game play is completed, thereby allowing the player to obtain physical possession of the probability ticket and enable verification of the integrity of the game;
(h) a first location within the gaming machine separate from the internal region that initially stores the probability tickets prior to their game play; and
(i) a conveyer that moves a probability ticket that is to be played from the first location to the internal region, wherein the probability ticket is dispensed by the ticket dispenser from the internal region when the game play is completed,
  wherein the internal region is at least partially visible to the player so that the player can view at least a portion of the probability ticket that is currently being played, and
  wherein all of the probability tickets include potential winning game elements so that every probability ticket is a potential winner, and winning depends solely upon player-entered selections being winning selections.

2. The gaming machine of claim 1 wherein the electronic display maintains the game elements on the electronic display after the probability ticket is dispensed, thereby further enabling verification of the integrity of the game by the player.

3. The gaming machine of claim 1 wherein the electronic display and the player input are both provided by a single touch screen.

4. The gaming machine of claim 1 wherein the indicia on the probability tickets that identifies game elements is machine readable indicia.

5. The gaming machine of claim 1 wherein the probability tickets are pre-printed probability tickets that are pre-printed prior to being placed inside of the gaming machine.

6. The gaming machine of claim 1 wherein the gaming machine further comprises:

(h) a ticket printer in the internal region that prints the probability tickets on demand from blank paper stock, the ticket printer printing the indicia on the probability tickets that identifies game elements.

7. A gaming machine that conducts a probability game and dispenses probability tickets, the gaming machine comprising:

(a) a memory device that provides indicia to be printed on the probability tickets that identifies game elements;
(b) blank paper stock inside of the gaming machine for printing the probability tickets on demand;

(c) a ticket printer inside of the gaming machine that prints the probability tickets to be played from the blank stock using the indicia received from the memory device;

(d) an electronic display that presents the game elements of the probability ticket being played;

(e) a player input that receives player-entered selections associated with the game elements of the probability ticket being played until game play is completed;

(f) a memory that stores the player-entered selections;

(g) a comparator configured to:
  (i) electronically compare the player-entered selections in the memory to the game elements of the probability ticket provided from the memory device to determine if the player-entered selections are winning selections, and
  (ii) cause the electronic display to inform the player whether winning selections were made;

(h) a ticket dispenser that dispenses the probability ticket from the gaming machine when the game play is completed, thereby allowing the player to obtain physical possession of the probability ticket and enable verification of the integrity of the game;

(i) a first location within the gaming machine that stores the blank paper stock; and (j) an internal region of the gaming machine separate from the first location that stores the printed probability ticket currently being played, wherein the probability ticket is dispensed by the ticket dispenser from the internal region when the game play is completed, wherein the internal region is at least partially visible to the player so that the player can view at least a portion of the probability ticket that is currently being played, and wherein all of the probability tickets include potential winning game elements so that every probability ticket is a potential winner, and winning depends solely upon player-entered selections being winning selections.

8. The gaming machine of claim 7 wherein the electronic display maintains the game elements on the electronic display after the probability ticket is dispensed, thereby further enabling verification of the integrity of the game by the player.

9. The gaming machine of claim 7 wherein the electronic display and the player input are both provided by a single touch screen.

10. The gaming machine of claim 7 wherein the memory device is a memory of a remote server.

11. The gaming machine of claim 7 wherein the memory device is a portable memory device physically located in the gaming machine.

* * * * *